(12) United States Patent
Kuo et al.

(10) Patent No.: US 7,489,459 B2
(45) Date of Patent: Feb. 10, 2009

(54) LENS ACTUATING APPARATUS

(75) Inventors: Li-Te Kuo, Jhudong Township (TW); Mei-Ling Lai, Taiping (TW)

(73) Assignee: Wah Hong Industrial Corp., Kaohsiung (TW)

( * ) Notice: Subject to any disclaimer, the term of this patent is extended or adjusted under 35 U.S.C. 154(b) by 0 days.

(21) Appl. No.: 12/148,606

(22) Filed: Apr. 21, 2008

(65) Prior Publication Data

US 2008/0304169 A1  Dec. 11, 2008

(30) Foreign Application Priority Data

Jun. 6, 2007  (TW)  .............................. 96120371 A

(51) Int. Cl.
  *G02B 7/02* (2006.01)
  *G11B 7/00* (2006.01)
(52) U.S. Cl. ........................ 359/824; 359/814; 359/823; 369/44.15; 369/44.32
(58) Field of Classification Search ................ 359/811, 359/813, 814, 823, 824, 199, 213, 290, 291, 359/694, 696, 698; 369/44.14–44.16, 44.27, 369/44.28, 44.32, 53.19; 250/306, 307, 309–311; 348/374; 267/161
See application file for complete search history.

(56) References Cited

U.S. PATENT DOCUMENTS 4,708,420 A * 11/1987 Liddiard ...................... 359/199
5,661,591 A * 8/1997 Lin et al. ...................... 359/290
6,538,747 B1 * 3/2003 Arnold ........................ 356/512
6,867,897 B2 * 3/2005 Patel et al. ................... 359/291
6,873,450 B2 * 3/2005 Patel et al. ................... 359/291
7,170,665 B2 * 1/2007 Kaneko et al. .............. 359/290
7,372,025 B2 * 5/2008 Hoen et al. .................. 250/306

FOREIGN PATENT DOCUMENTS

| JP | 2002365514 | 12/2002 |
| JP | 2005128392 | 5/2005 |
| TW | M285846 | 1/2006 |

* cited by examiner

*Primary Examiner*—Loha Ben
(74) *Attorney, Agent, or Firm*—C. G. Mersereau; Nikolai & Mersereau, P.A.

(57) ABSTRACT

A lens actuating apparatus includes a fixed part, a moving part and at least one flexible part. The moving part is movably located on the fixed part. The flexible part has four contacting portions that form a hollow enclosed body. Two contacting portions that are located at the diagonal direction fasten the fixing part, and the other two contacting portions that are located at another diagonal direction contact the moving part. When the moving part has a movement related to the fixed part, the contacting portions of the flexible part contacted the moving part move far away from the fixed part. Thereby, the moved contacting portions exert a flexible recovery force to the moving part. The flexible part can be fully utilized in a limited space and does not affect the allocation of the other elements.

16 Claims, 6 Drawing Sheets

LENS ACTUATING APPARATUS

BACKGROUND OF THE INVENTION

1. Field of the Invention

The present invention relates to a lens actuating apparatus. In particular, this invention relates to a lens actuating apparatus that is applied to a mini image-capturing module for actuating the lens.

2. Description of the Related Art

Recently, the image-capturing module becomes a popular module for hand-held devices, such as cell phones, Personal Digital Assistants (PDAs), etc. As the hand-held devices have a trend of having high quality functions and being smaller, the image-capturing module has to meet the requirements of having high image quality and being miniaturized. For enhancing the image quality of the image-capturing module, the first method is to increase the image pixels. The number of image pixels has been increased from three hundred thousands pixels, to one million pixels, two million pixels, three million pixels, four million pixels, and five million pixels. The second method is to improve the definition of the captured-image. The function of the image-capturing module of the hand-held device has been improved from constant focal distance image-capturing to automated optical focusing and zooming.

The operation principle of the automated optical focusing is to properly move the lens in the image-capturing module according to the distance of the target object so that the optical image of the target object is exactly focused on the image sensor to generate a clear image. The lens in the image-capturing module is actuated by a stepping motor, a piezo-electricity actuator, or a voice coil motor, etc.

The voice coil motor is to place a coil in a magnetic path of a permanent magnet. According to Fleming's left hand rule, the coil reacts with the permanent magnet to generate a pushing force when the coil is conducted, and the carrying base connected with the permanent magnet is moved. Thereby, the lens set fastened on the carrying base is moved. However, the actuating force from the voice coil motor has to be balanced with a recovering force to make the lens positioning on the target position. Therefore, a flexible plate is added to the voice coil motor to provide the recovering force. Then, by adjusting the current flowing through the coil, the optical zooming and focusing functions are achieved.

Taiwan patent M285846 (application number: 094217663) discloses a flexible plate with a voice coil motor. It locks flexible plate with the lens frame and the outer frame of the voice coil motor. By utilizing the flexible force of the flexible plate, the recovering force is obtained. However, the design of the flexible plate is similar to the design of an inner circular plate connected with an outer circular plate into one piece. The dimensions of the flexible plate cannot be reduced to meet the requirements of the image-capturing module being miniaturized.

Japanese patent 2005-128392 discloses a lens actuating apparatus. The lens actuating apparatus includes a front flexible plate and a rear flexible plate. By utilizing the front flexible plate and the rear flexible plate, the recovering force is obtained. However, the design of the lens actuating apparatus is also similar to the design of an inner circular plate connected with an outer circular plate into one piece. The drawback is the same as the above.

Furthermore, Japanese patent 2002-365514 discloses a lens actuating apparatus. The lens actuating apparatus also includes a front flexible plate and a rear flexible plate. The front flexible plate and the rear flexible plate respectively are composed of a semi-circular inner portion and a semi-circular outer portion. The design of the lens actuating apparatus is the same as to the design of an inner circular plate connected with an outer circular plate. It also has the same drawback. The design of the other elements is restricted by the dimensions of the lens actuating apparatus, and the image-capturing module cannot be miniaturized.

SUMMARY OF THE INVENTION

One particular aspect of the present invention is to provide a lens actuating apparatus that uses at least one flexible part to generate the flexible recovery force to overcome the space limitation of the lens in the image-capturing module and meet the requirements of the lens movement and recovery. It fully utilizes the flexible part to avoid the allocation limitation problem of the other elements. Therefore, the image-capturing module can be miniaturized.

The lens actuating apparatus includes a fixed part, a moving part movably located on the fixed part, and at least one flexible part having four contacting portions that form a hollow enclosed body. Two contacting portions that are located at the diagonal direction fasten the fixing part, the other two contacting portions that are located at another diagonal direction contact the moving part. When the moving part has a movement related to the fixed part, the contacting portions of the flexible part contacted the moving part move far away from the fixed part. Thereby, the moved contacting portion exerts a flexible recovery force to the moving part.

The present invention has the following characteristics. In addition to recover the moving part, the flexible parts are easily allocated and assembled. The manufacturing process is simple. Furthermore, the flexible parts can be fully utilized within a limited space due to its structure. Therefore, the allocation limitation problem of the other elements is avoided, and the image-capturing module can be miniaturized.

For further understanding of the invention, reference is made to the following detailed description illustrating the embodiments and examples of the invention. The description is only for illustrating the invention and is not intended to limit of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
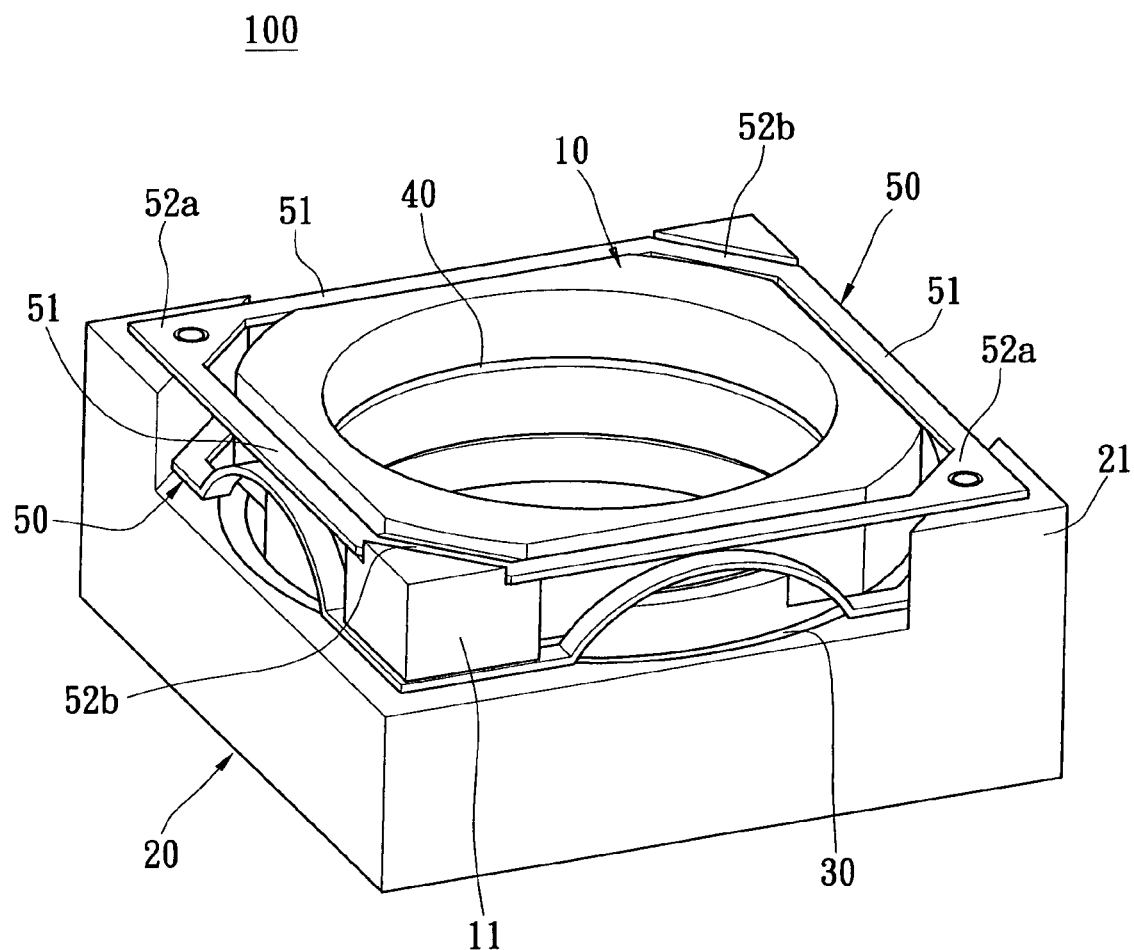
FIG. 1 is a perspective view of the lens actuating apparatus of the first embodiment of the present invention.
Figure 2:
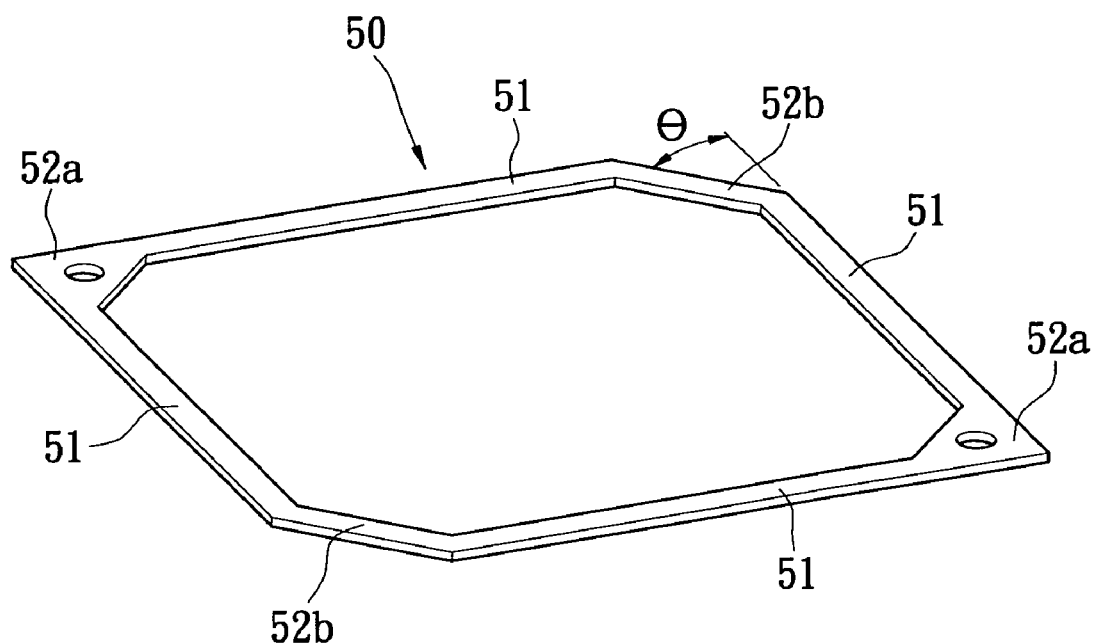
FIG. 2 is a perspective view of the flexible part of the present invention.
Figure 3:
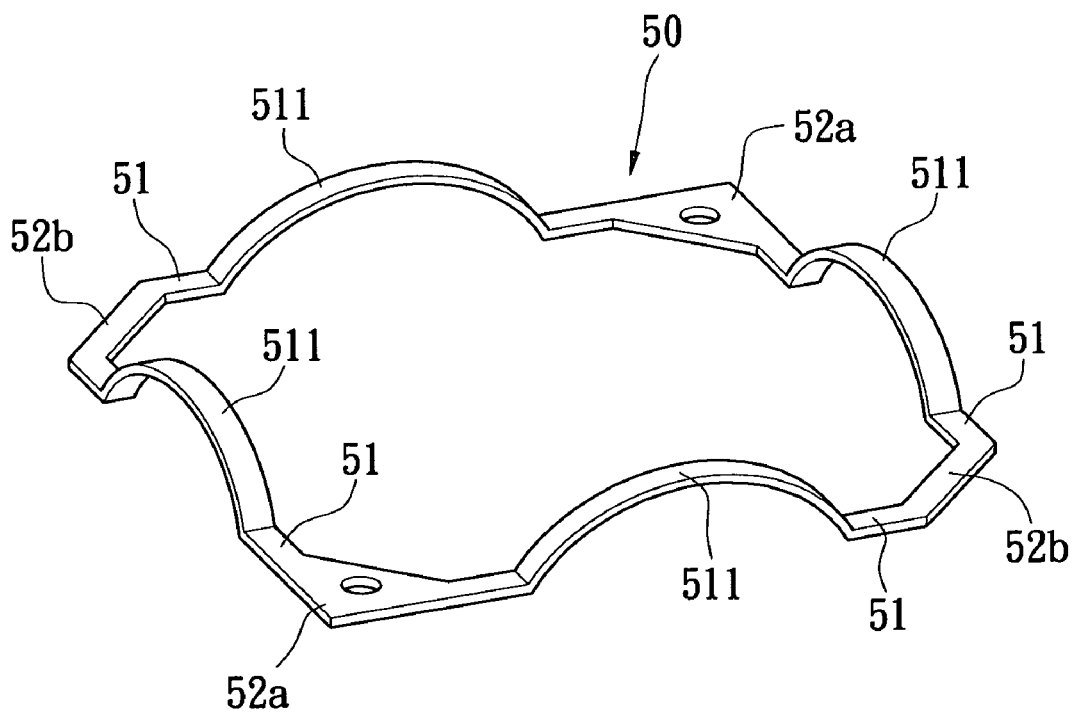
FIG. 3 is a perspective view of another flexible part of the present invention.

Reference is made to FIGS. 1, 2 and 3. FIG. 1 shows the lens actuating apparatus of the first embodiment of the present invention. The lens actuating apparatus 100 includes a lens set 10, a fixed base 20, a coil set 30, at least one magnetic element 40, and at least two flexible parts 50.

The lens set 10 is located with a lens (not shown in the figure) for capturing the image. The lens set 10 and the magnetic element 40 are assembled to form the moving part of the present invention. The magnetic element 40 is a magnet, or a ferromagnetic material part. The fixed base 20 and the coil set 30 are assembled to form the fixed part of the present invention. The moving part is movably located on the fixed part. When the coil set 30 is conducted with current, a magnetic field is generated. The magnetic field and the magnetic line of the magnetic element 40 are reacted to generate an electromagnetic force. The electromagnetic force drives the moving part so that the moving part axially moves along the fixed part.

The assembling methods can be implemented in different ways. For example, the coil set 30 can be assembled with the lens set 10 to form the moving part, and the magnetic element 40 can be assembled with the fixed base 20 to form the fixed part (this embodiment is not shown in the figure).

In this embodiment, the number of the flexible parts 50 is two. However, the number of the flexible parts 50 can be one or more than two. The flexible part 50 is a flexible frame body. Each of the flexible parts 50 has four bendy portions 51 and four contacting portions 52a, 52b that located at the four corners. Two ends of each of the bendy portions 51 respectively are connected with one end of one of the contacting portions 52a, 52b to form a hollow enclosed body. There is an angle θ between the outside surface of two contacting portions 52b located at the diagonal corner and the outside surface of the bendy portion 51.

The bendy portion 51 of one of the flexible parts 50 can be flat, and the bendy portion of another flexible part 50 is warped upward to form a warping portion 511.

The diagonal corners of the fixed base 20 respectively have a fixed portion. The outside edge of the lens set 10 protrudes outward to form two symmetrical protruding portions 11.

Two flexible parts 50 are respectively located between the lens set 10 and the fixed base 20 at intervals. The two flexible parts 50 are located at the outside edge of the lens set 10. The two diagonal contacting portions 52a of one of the flexible part 50 are respectively located on the fixed portions 21 of the fixed base 20, and the two diagonal contacting portions 52b of the flexible part 50 contact the surface of the protruding portion 11 of the lens set 10. The two diagonal contacting portions 52b of another flexible part 50 are fastened on the fixed base 20, and the two diagonal positioning portions 52a of another flexible part 50 contact another surface of the protruding portion 11 of the lens set 10.

When the coil set 30 is conducted with current and is reacted with the magnetic element 40, the generated electromagnetic force drives the lens set 10 of the moving part to have a movement related to the fixed base 20 of the fixed part. Therefore, the contacting portions 52b, 52a of the flexible parts 50 that contact with the lens set 10 move along a direction that is far away from the fixed base 20 (this means flexible deformation). The moved contacting portions 52b, 52a of the flexible parts 50 exert a flexible recovery force to the lens set 10. When the current of the coil set 30 is adjusted or turned off, the flexible recovery force generated by the two flexible parts 50 recovers the lens set 10 to its original location. The warping portion 511 of the flexible portion 50 can enhance the recovery force of the flexible part 50 so that the recovery speed of the moving part is improved.

Alternatively, the quantity of the flexible parts 50 and the assembling method can be implemented by the following ways.

(1) Only one of the two flexible parts 50 is used for fastening the moving part and the fixed part.

(2) One of the flexible parts 50 is selected, such as the flexible part 50 with a flat bendy portion 51 or the flexible part 50 with a portion 51 having a warping portion 511, and the quantity of the flexible part is two or more than two for respectively fastening the moving part and the fixed part.

(3) Two or more than two flexible parts 50 in this embodiment are used for respectively fastening the moving part and the fixed part (as shown in FIG. 1).

Figure 4:
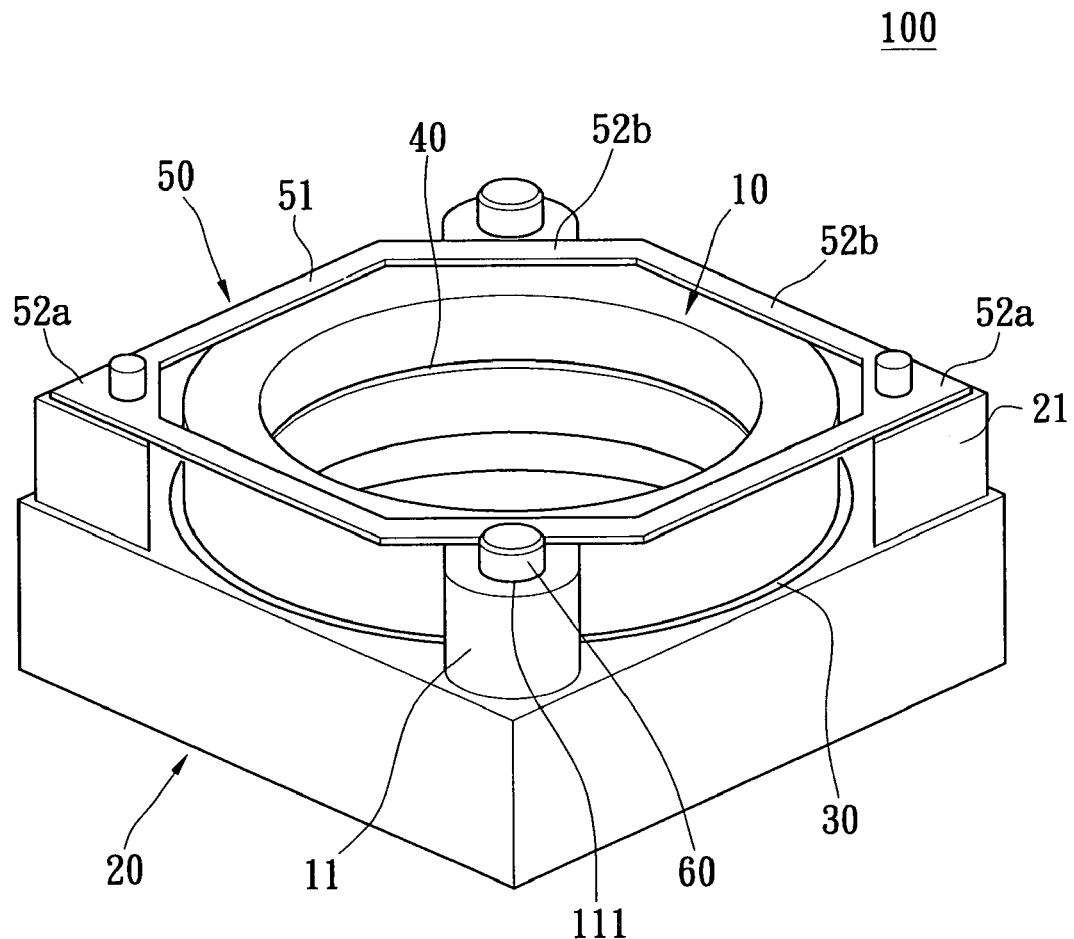
FIG. 4 is a perspective view of the lens actuating apparatus of the second embodiment of the present invention.
Figure 5:
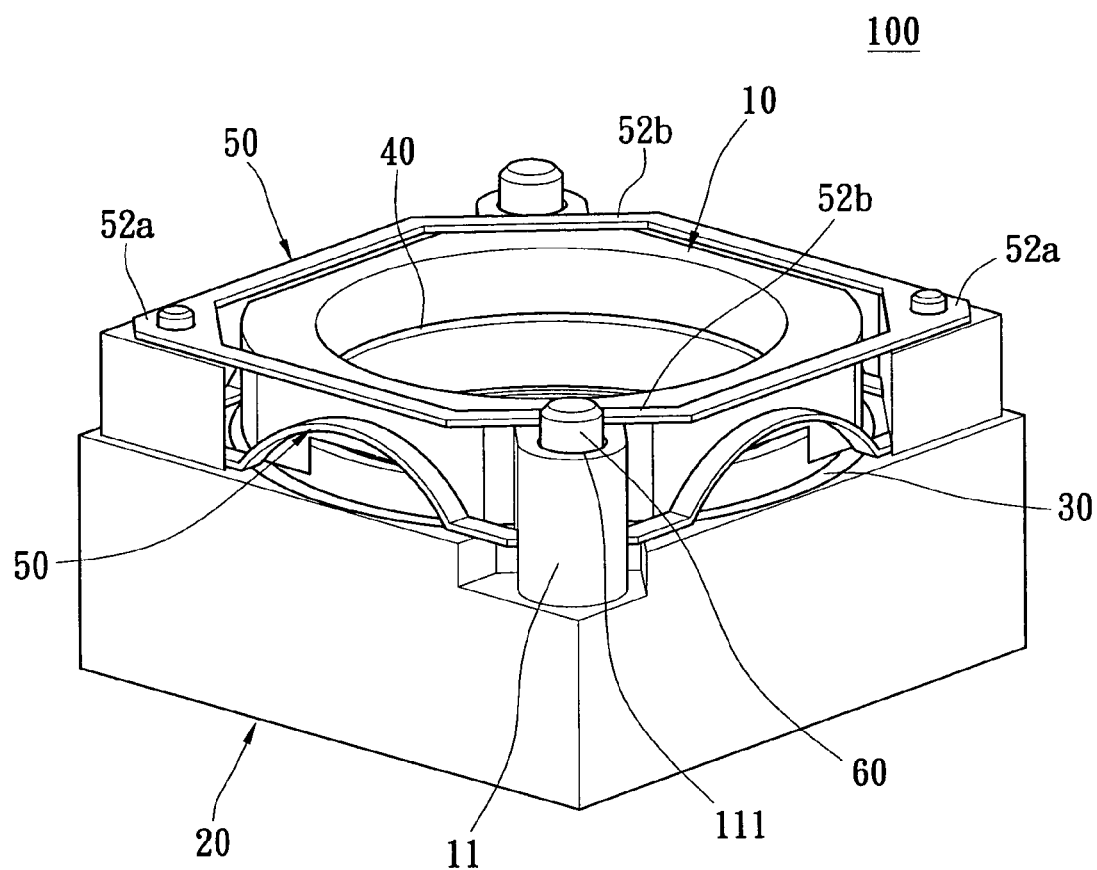
FIG. 5 is another perspective view of the lens actuating apparatus of the second embodiment of the present invention.

Reference is made to FIGS. 2, 3, 4 and 5. FIGS. 4 and 5 show the lens actuating apparatus of the second embodiment of the present invention. The difference between the second embodiment and the first embodiment is described as the followings. At least one movement guiding portion 60 is included, and is located on the fixed base 20 of the fixed part. The movement guiding portion 60 is a fastened shaft, and the protruding portion 11 of the lens set 10 of the moving part has a circular hole 111 along the axial direction for being plugged with the movement guiding portion 60 so that the lens set 10 is movably located on the fixed base 20 along the movement guiding portion 60.

Similarly, one of the flexible parts 50, or two or more than two flexible parts 50 are used for fastening the moving part and the fixed part to recover the moving part to its original location.

Figure 6:
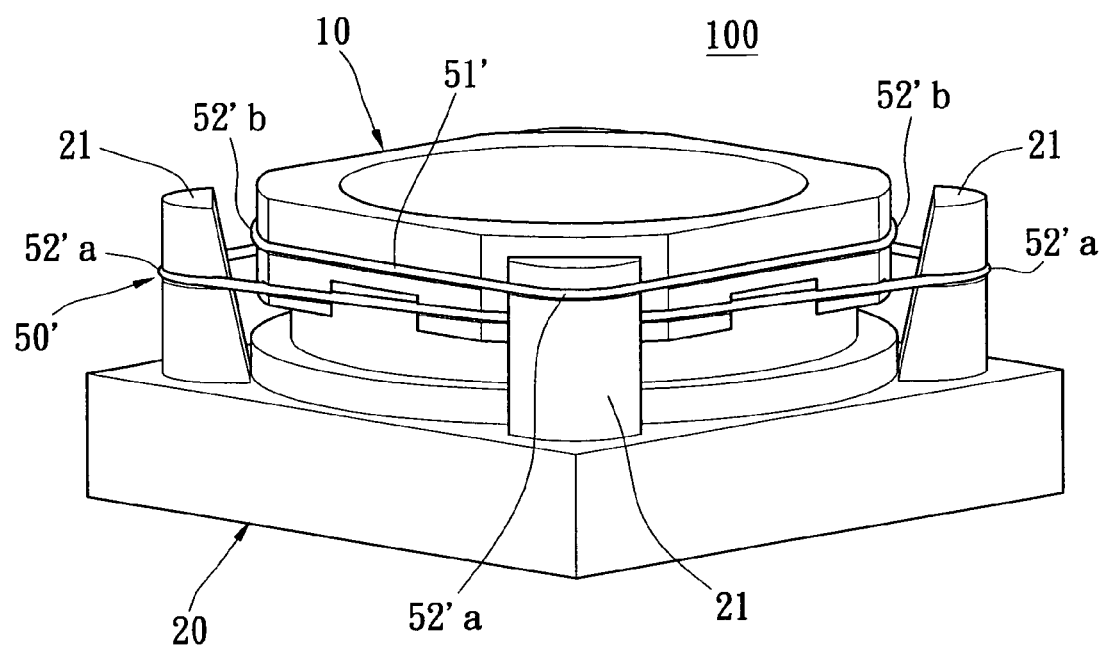
FIG. 6 is a perspective view of the lens actuating apparatus of the third embodiment of the present invention.
Figure 7:
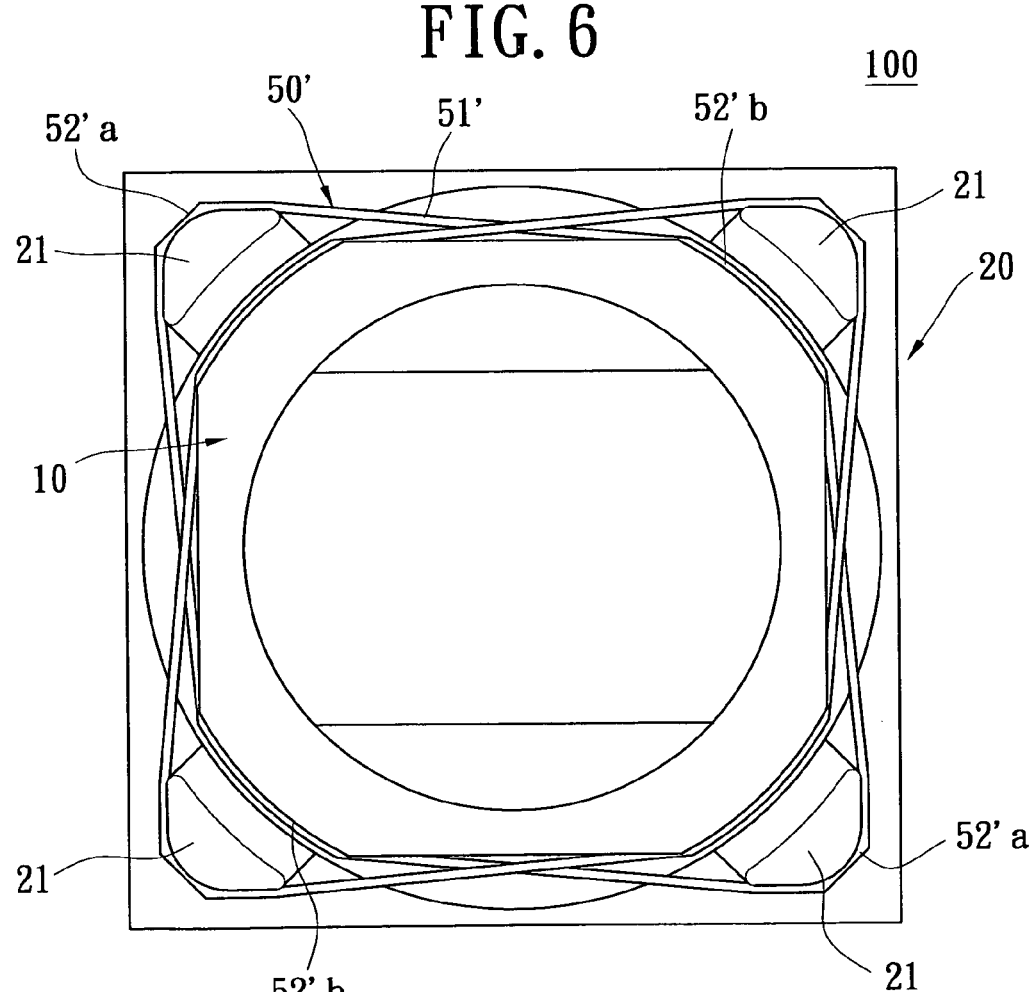
FIG. 7 is a top view of the lens actuating apparatus of the third embodiment of the present invention.

Reference is made to FIGS. 6 and 7, which show the lens actuating apparatus of the third embodiment of the present invention. The difference between the third embodiment and the first embodiment is described as the followings. The flexible part 50' is a flexible enclosed wire body, and has four bendy portions 51' and four contacting portions 52'a, 52'b. Two ends of each of the bendy portion 51' respectively are connected with one end of one of the contacting portions 52'a, 52'b to form a hollow enclosed body.

In this embodiment, the four corners of the fixed base 20 of the fixed part respectively have a fixed portion 21. Two flexible parts 50' are used as an example. The two diagonal contacting portions 52'a of one of the flexible parts 50' are embedded the outside surface of the two diagonal fixed portions 21 of the fixed base 20, and the two diagonal contacting portions 52'b of the flexible part 50 are embedded/contact the outside surface of the lens set 10. The two diagonal contacting portions 52'a of another flexible part 50' are fastened on the outside surface of another two diagonal the fixed portions 21 of the fixed base 20, and the two diagonal contacting portions 52'b of another flexible part 50 are fastened/contact the outside surface of the lens set 10. Thereby, the contacting portions 52'a, 52'b of the two flexible parts 50' are respectively staggered and fastened on the diagonal corners of the outside surface of the lens set 10.

When the lens set 10 of the moving part has a movement related to the fixed base 20 of the fixed part, the lens set 10 makes the contacting portions 52'b of the two flexible parts 50' to move so that the contacting portions 52'b of the two flexible part 50' moves in a direction that is far away the fixed base 20. The moved contacting portions 52'b exert a flexible recovery force on the lens set 10. When the current of the coil set 30 is adjusted or turned off, the flexible recovery force generated by the two flexible parts 50' recovers the lens set 10 to its original location to achieve the same effect.

Figure 8:
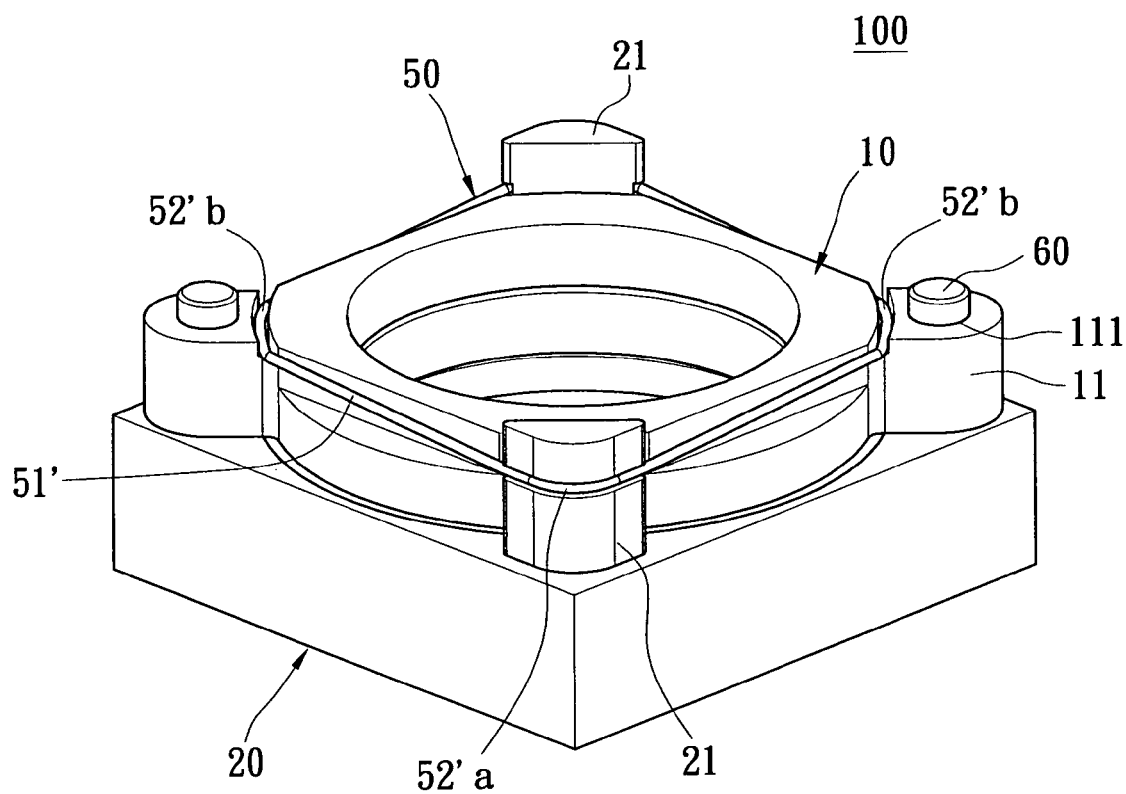
FIG. 8 is a perspective view of the lens actuating apparatus of the fourth embodiment of the present invention.

Reference is made to FIG. 8, which shows the lens actuating apparatus of the fourth embodiment of the present invention. The difference between the fourth embodiment and the third embodiment is described as the followings. The structure in the second embodiment is adopted. At least one movement guiding portion 60 is included and is located on the fixed base 20 of the fixed part, and the lens set 10 has a protruding portion 11. Thereby, the lens set 10 is movably located on the fixed base 20 along the movement guiding portion 60. Two diagonal corners of the fixed base 20 respectively have a fixed portion 21.

In this embodiment, one flexible part 50' is used as an example. The two diagonal contacting portions 52'*a* of the flexible part 50' are fastened onto the outside surface of the diagonal fixed portions 21 of the fixed base 20, and the diagonal contacting portions 52'*b* of the flexible part 50' are fastened/contact the side surface of the protruding portion 11 of the lens set 10 to achieve the same effect.

The quantity of the flexible parts 50' in the third embodiment and the fourth embodiment can be one, two, or more than two.

The structure (such as a frame body or an enclosed wire body) of the flexible parts 50, 50' of the lens actuating apparatus 100 can recover the moving part to its original location. The flexible parts 50, 50' can be easily allocated and assembled, and the manufacturing process is simple. Furthermore, by utilizing the structure of the flexible parts 50, 50', the flexible parts 50, 50' can be fully utilized within the limited space, and the allocation problem of the other elements (such as the lens set 10 and the fixed base 20) restricted by the flexible parts 50, 50' is avoided. The image-capturing module can be miniaturized.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A lens actuating apparatus, comprising:
    a fixed part,
    a moving part movably located on the fixed part; and
    at least one flexible part having four contacting portions that form a hollow enclosed body, wherein two contacting portions that are located at a diagonal direction fasten the fixed part, and the other two contacting portions that are located at another diagonal direction contact the moving part;
    wherein the contacting portions of the flexible part contacting the moving part move far away from the fixed part and the contacting portions exert a flexible recovery force to the moving part when the moving part has a movement related to the fixed part.

2. The lens actuating apparatus as claimed in claim 1, wherein the fixed part has at least two fixed portions for fastening the two contacting portions of the flexible part.

3. The lens actuating apparatus as claimed in claim 1, wherein the fixed part includes a coil set.

4. The lens actuating apparatus as claimed in claim 3, wherein the moving part has a lens set, and at least one magnetic element assembled with the lens set.

5. The lens actuating apparatus as claimed in claim 4, wherein the magnetic element is a magnet or a magnetic-conducting material element.

6. The lens actuating apparatus as claimed in claim 1, wherein the moving part has a lens set, and a coil set assembled with the lens set.

7. The lens actuating apparatus as claimed in claim 6, wherein the fixed part includes at least one magnetic element.

8. The lens actuating apparatus as claimed in claim 7, wherein the magnetic element is a magnet or a magnetic-conducting material element.

9. The lens actuating apparatus as claimed in claim 1, wherein the flexible part has four bendy portions, two ends of bendy portions respectively connected with one of the contacting portions to form a hollow enclosed body.

10. The lens actuating apparatus as claimed in claim 9, wherein each bendy portion is plat.

11. The lens actuating apparatus as claimed in claim 9, wherein each bendy portion wraps upward to form a warping portion.

12. The lens actuating apparatus as claimed in claim 1, wherein the flexible part is a frame body.

13. The lens actuating apparatus as claimed in claim 1, wherein the flexible part is an enclosed wire body.

14. The lens actuating apparatus as claimed in claim 1, wherein the quantity of the flexible parts is two or more than two, and the flexible parts are located on the fixed part and the moving part at intervals.

15. The lens actuating apparatus as claimed in claim 1, further comprising a movement guiding portion located on the fixed part, wherein the moving part is movably located on the fixed part along the movement guiding portion.

16. The lens actuating apparatus as claimed in claim 15, wherein the movement guiding portion is a fastening shaft.

* * * * *